C. NAPIER.
APPARATUS FOR MAKING TEMPERED BLADES.
APPLICATION FILED JAN. 4, 1919.
1,350,618. Patented Aug. 24, 1920.
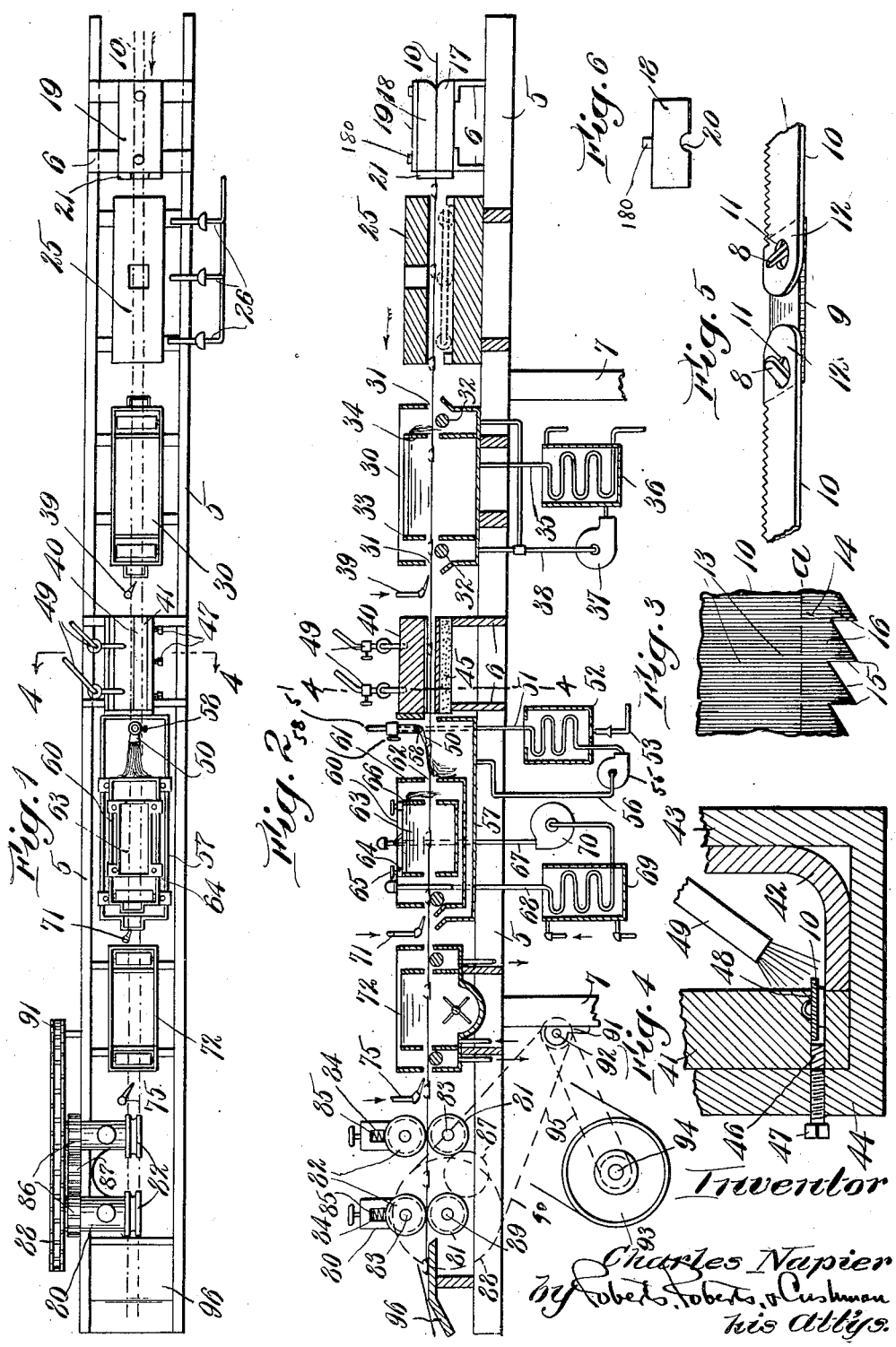
Inventor
Charles Napier
by Roberts, Roberts & Cushman
his Attys.

UNITED STATES PATENT OFFICE.

CHARLES NAPIER, OF SPRINGFIELD, MASSACHUSETTS, ASSIGNOR TO NAPIER SAW WORKS INC., OF SPRINGFIELD, MASSACHUSETTS, A CORPORATION OF MASSACHUSETTS.

APPARATUS FOR MAKING TEMPERED BLADES.

1,350,618.          Specification of Letters Patent.     Patented Aug. 24, 1920.

Application filed January 4, 1919. Serial No. 269,598.

*To all whom it may concern:*

Be it known that I, CHARLES NAPIER, a citizen of the United States of America, and resident of Springfield, in the county of Hampden and State of Massachusetts, have invented new and useful Improvements in Apparatus for Making Tempered Blades, of which the following is a specification.

This invention relates to the heat treatment of metal articles, and comprises apparatus for making a new blade or tool having new and valuable characteristics, and for practising an improved method or art of making such articles.

A principal object of the invention is to provide apparatus for treating saw blades so as to make a blade having a cutting edge of greater hardness than has heretofore been practicable and in which neither body nor edge will break under the ordinary strains of use. Other objects are to provide an improved machine for automatically subjecting a connected succession of strips or blades or a continuous strip or blade to regulated successive changes of temperature, and to provide improved means for subjecting the material to different temperatures.

In my Letters Patent No. 1,221,576, dated April 3, 1917, I have explained a machine for successively, continuously and uniformly tempering saw-blades, and in my Letters Patent No. 1,265,944, dated May 14, 1918, I have explained a method of heat-treating such blades adapted to be carried out with the aid of such a machine, the product of the later patent being a uniformly tempered blade with annealed or soft ends useful as a hack-saw and for other purposes. Such blades are first hardened and then draw-tempered throughout their middles and edges to the degree of hardness or temper heretofore customary for such blades. This customary degree of temper is such, in the instance of the hack-saw, band saw and other such blades of prior knowledge, as to provide a moderately flexible and resilient blade uniformly hard enough to enable any of its edges to serve as a metal-cutting edge, the finished blade proper, including the edge, being thus characterized by a uniform crystalline structure with a low elastic limit, and therefore being brittle against sharp bending or sudden blows.

Tool-steels available for such blades have heretofore been treated to a state of compromise between resilient flexibility and hardness, a high elastic limit being attained by draw-tempering with any available material only upon treatment resulting in reducing the hardness of the metal below an attainable, and for metal-cutting purposes, the most useful value or degree. For instance, it is my experience that a "glass-hard" state, attained by first heating to a high critical temperature and then chilling or quenching, is most useful for the edges, points or teeth of a metal-cutting saw, knife, or milling cutter in respect to its attack upon the material; but it is also my experience that this state is impracticable for such an instrument as a saw-blade, because the desirable quality of extreme hardness is accompanied by such brittleness and susceptibility to breakage in use as to limit unduly the life of the tool.

It has therefore been customary heretofore to sacrifice the quality of maximum hardness in favor of an increased springiness and toughness, the blades being tempered by subjection to a moderate uniform heating after hardening so as to stand moderate bending without breakage, despite the fact that this treatment reduces the extreme hardness of the cutting edge which it would have been advantageous to retain if there were any way to keep it compatible with securing toughness and resilience. When hard enough to cut, the blade still remains so brittle as to require the most careful use.

I have discovered that a cutting edge of such a tool as a knife, band-saw or hack-saw blade may be kept at a point at or near its maximum hardness, thereby to produce a cutting tool of heretofore unknown durability and efficiency, if the hard edges or portions are supported by intimate and integral contact with portions of the body of the blade gradually decreasing in hardness and increasing in resilience or softness within the hard points or edges. For instance, points or edge portions which have been heated above the hardening reaction point, quenched or chilled, [and if desired slightly draw-tempered, to an extent not reducing the desired hardness for cutting, at a low heat, about 350° F. for instance, for tool-steels of usual composition] may be supported upon integral base or backing of the same metal which has been first hardened and then drawn, as the edge is receded from, at temperatures varying with the extent of recession from the hard points or edges from about 350° to about 800° F., or such other temperature as will leave the article in a springy resilient state. Such a spring temper is a highly desirable quality of the blade proper of such an article, but it is not compatible with sufficient hardness for metal cutting, and is as detrimental at the ultimate cutting edge or point as it is valuable in the body of the tool.

I have devised and have explained in my application Serial No. 265,836, filed December 9, 1918, a method or art of rapidly, uniformly, and if desired, continuously treating such articles so as to provide them with hard cutting points or edges and with gradually and increasingly softer and more flexibly resilient supports for the point or edge within the point or edge, and with uniform spring-tempered bodies integral with and bearing such support and edge. As an article of manufacture, the resulting product retains the cutting quality of hard teeth or edges against long wear, and resists breakage remarkably. I shall describe as one instance only of the genus of new apparatus herein claimed for practising the new method and making the new product a machine adapted to treat hack-saw or band-saw blades but applicable without change to the treatment of other specific articles.

In the accompanying drawings,—

Figure 1 is a diagram plan view of the apparatus;

Fig. 2 is a vertical longitudinal section on the median line of Fig. 1;

Fig. 3 is a diagram detail of a saw blade treated in the apparatus;

Fig. 4 is a section on line 4—4 of Fig. 2;

Fig. 5 is a perspective showing two saw blades and a connector link; and

Fig. 6 is a detail front elevation of a tension device.

Referring now to Figs. 3 and 5, if the instrument is a saw, a preferred state of the metal is that in which the blade 10 is uniformly spring-tempered to a flexible resilience with a high elastic limit throughout the region 13 comprising the greater part of the body or blade; and in which the points, faces and cutting edges 15 of the teeth are of the maximum hardness compatible with enough tensile coherence to prevent chipping or shivering. At the ultimate edges and points, this may be the maximum crystalline hardness which the metal is capable of assuming, such as will follow heating above the critical temperature [1200° to 1400° F. or higher for tool steels of commercial composition] and immediate quenching at temperatures at or below 350° F.

If any considerable depth of the teeth or edges of the saw is in such a crystalline state, breakage under use is inevitable. For instance, if a whole tooth comprising the points and edges and faces 15 and the base or root 16 is in this state, breakage of that tooth under lateral strain or a sharp blow or bending of the blade at a moderate angle is to be expected. If the region 14 adjoining the teeth is glass hard, such a breakage may involve two or more teeth. But if only the faces and edges and points are of a crystalline hardness, if the roots or bases 16 are hard but tough, and if the region 14 back of the roots 16 partakes of the qualities of resilience and flexibility, breakages of teeth do not occur. Desirably, then, the hard points and faces 15 and the spring-tempered body 13 are separated by a region 14 partaking of the qualities of the hard parts at these parts, and of the quality of the springy part at the juncture at line a of the blade, which may be near the toothed or cutting edge. I have found that the best results for efficiency and durability are attained when the region 13 is uniformly spring-tempered and when the region 14 increases in hardness from uniformity with the temper of region 13 from the line a toward the toothed edge.

These conditions are best attained when the treatment of the blade can be regulated exactly as regards temperature, the medium in which the temperature is attained, the duration of each stage of treatment, and the interval of time at passage from one state of temperature to another. The present invention provides for producing such an article by practice of the process of my said application, mechanical aids to subjecting the material for the preferred times to the preferred conditions, by which a succession of individual blades or a continuous strip is passed at a constant rate through suitable agencies for heating, quenching, differentially heating, temper-drawing, checking and cleansing the blades.

If discontinuous, the blades are made up by connection end to end in a chain.

Referring now to Figs. 1, 2 and 5, any convenient means for joining detached blades in a chain end to end for passage continuously through the apparatus may be employed; such as flat rectangular sheet metal links or holders 9 having upstanding lugs 8 (which may be integrally stamped from the body 9) inserted in the holes 11 in the contiguous ends of the chain. Such a chain is made up at the right of Figs. 1 and 2, and passed through the apparatus from right to left by means presently mentioned, preferably including means near the entrance end for subjecting the chain or band to longitudinal tension.

The apparatus may be erected on a suitable frame such as the longitudinal members 5, the transverse struts 6, and the legs 7, the treated articles traversing the different treating means arranged at intervals on the table or frame so formed. The chains of articles or saws may be made up and wound on a large drum as a separate and previous operation, or an operator at the entrance end of the machine may apply the links 9 and new blades as fast as the chain moves into the apparatus. A preferred rate of motion for such articles as hack-saw blades is about fourteen feet a minute, which is not too fast for manual joining of the blades.

The apparatus comprises feeding means at 80 for moving the article-chain at the designed rate through the machine, which may be generally similar to the feeding device in my said Letters Patent No. 1,221,576, comprising a frame 80 fixed to frame members 5, lower rolls 81 in shafts 89 in bearings in frame 80, and upper grooved rolls 82 on shafts 83 free to rise in slots 84 in the frame against blocks held by adjustable springs 85. Rolls 81 are integral or rigid with gears 86, suitably connected to move in unison, as by idler 87. The lower rolls may be driven, as by a sprocket 88 on one of the shafts 89, driven by a chain 90 from a sprocket 91 on a shaft 92 in bearings on the frame; which shaft may be driven in any suitable manner, as from a floor-stand pulley 93 on a constantly driven shaft 94 connected to shaft 92 by a chain 95 and suitable sprockets on shafts 94 and 92. Any suitable means may be employed instead to move the chain of saws either continuously or intermittently at short intervals.

The finished saws are delivered by the feed rolls 81, 82, to a table 96, at which they may be disconnected from holders 9 by gravity. Preferably the holders 9 are arranged with their lugs 8 upward to permit disconnection while a following saw is still in the grip of the rolls 81, 82.

At the entrance end, Figs. 1, 2 and 6, a preferred tension device comprises a table 17 and weight 18, to which extra weights 19 perforated to take over lugs 180 on weight 18 can be added to adjust the tension. Weight 18 is grooved at 20 for the lugs 8, and a stop as at 21 on table 17 is provided to prevent the drag of the chain of saws 10 from moving the weights. But any other suitable means for tensioning the chain may be used.

The tense run of the chain between the feeder and the tension device represents the time of the whole cycle of operations at the speed set by the feeder, and the apparatus will have sufficient length to allow the saws to pass through the desired cycle of operations between these points.

The moving saws are arranged to pass first through means for heating them to the desired high heat for hardening. This means preferably comprises a gas muffle furnace 25 of any preferred form having a straight passage for the saws and long enough at its intended temperature to heat the saws to temperatures from 1200° to 1400° F. or higher during the time of their passage at the selected rate of feed. The temperature may be regulated without changing the rate of motion of the saws 10 by adjusting, or employing more or fewer gas-blasts 26 heating the muffle.

The saws are quenched after heating at 25, and preferably as shortly after as possible. A quenching tank 30 of a preferred form is shown, having openings 31 and rolls 32 to pass and support the saws, and transverse partitions 33, 34, having openings in line with the openings 31. The inner compartment between the partitions 33, 34, is kept full of relatively cold oil, emulsion or other quenching agent by induct pipe 35, cooler 36, and circulating pump 37 fed by pipes 38 from the outer ends of the tank. The quenching agent overflows the partition 34 to pour on the entering chain of red-hot saws. Preferred temperatures are from 80° to 100° F.

The mass of the links 9 may be so determined in relation to the temperature at 25 and the thickness of the saws as to delay cooling in tank 30. This results in leaving the region 12 of the saws soft. The quenching agent clinging to the saws is preferably blown off and back into tank 30 at its exit by an air-blast 39 suitably connected to a source of compressed air.

The apparatus comprises in the illustrated form means for simultaneously heating different longitudinal regions of the blade to different degrees to determine different crystalline reactions in the respective parts of the blade upon subsequent reduction of its temperature. Referring to Figs. 1, 2 and 4, such means, indicated generally at 40, may comprise a channeled metal heat-retaining and radiating block 41 suitably mounted in relation to the moving article-chain to communicate its own temperature to a part of the article, such as the region 13, and to protect this part of the article from a source of a higher temperature allowed to act on the remainder of the article, for instance the edge region 14 and teeth 15, 16. In the preferred form the elongate rectangular block 41 of iron or steel, is mounted in a channel-shaped base casting 44 resting on a heat-insulating block 45 suitably attached to the machine frame. A refractory lining 42 may be provided for base 44.

Block 41 is grooved at 48 to receive the article chain, except the edge to be heated to a high heat. Preferably means for adjusting the lateral position of the saws or other components of the chain are provided, such as the plugs 46 in bores in the block 41 communicating with channel 42, the plugs 46 being movable by adjusting screws 47 in the base 44.

The inner face of block 41 and the projecting edges of the blades are played upon by blasts from the inclined gas-blasts 49, which may be in any desired plurality, and separately adjustable.

Blocks 41 of different lengths, mass and surface area are provided for different effects on the articles in the differential heater 40. For the process of my said application, I prefer to heat the region 14 and the teeth of steel saws for metal-cutting to 1400° or more, and to heat the body region 13 of the blade to about 800° F. to draw the hardened blade to a spring temper. The block 41 radiates enough of the heat received from the gas flames to maintain a temperature somewhat in excess of 800°; but the thin blades exposed to the gas-flame are heated to the desired high temperature. It is not difficult to fix upon the angle and volume of the blasts 49, the length, mass and surface of the block 41 for any required range of differences of temperature between the longitudinally exposed and covered region of moving articles of any thickness desired for the uses general to this class of articles above mentioned as adapted for treatment. Metal-cutting saws I prefer to have leave the heater 40 at or near the temperatures 800° F. and 1400° F. for body and edge respectively. At the suggested speeds, the demarcation of these different temperatures at the line $a$, Fig. 3, is maintained for a considerable distance of travel of the blades after they leave the heater, dependent on the heat-conductivity of the metal.

The purpose being to harden the points, faces and edges of the saw-teeth, if the blade is a saw, or the edge if a knife-blade, the blades are immediately treated on leaving heater 40 to harden these edges, points and faces, to conserve or complete the spring temper of the body region 13, and to draw the temper gradually from the region 13 to the edge of the edge-strip 14. As explained in my said application, this can be done by subjecting the blades to a hot bath at about 350° F. during a predetermined time, and then lowering the temperature of the blades.

To carry out this step, preferred means comprises a nozzle 50 close to heater 40 delivering a flat stream of hot oil or other agent in the direction of travel of the chain, so as to follow and cling to the blades during a predetermined time. A shallow tank 57 of considerable length next to the heater 40 may be provided to receive the overflow from nozzle 50, which is fed through a pipe 51 from a heater 52 heated by a gas-blast 53 and connected to the delivery side of a pump 55 receiving from tank 57 through pipe 56. The heater, shown diagrammatically, may be arranged to be heated by waste heat from the muffle 25 or the heater 40, if desired.

The nozzle 50 is arranged to turn on the depending end of pipe 51, and may be fixed in adjusted position by set-screw 58.

At this stage of the process, the drop of temperatures of both the differently heated longitudinal regions of the blades determines the permanent shrinkage of the metal. By adjusting the rotative position of the nozzle 50 the line of first contact of the bath delivered by it can be delicately varied from a right angle to inclination in either direction, and set for each of materials of different characteristics to prevent unequal shrinkage.

The duration of exposure of the material to the hot bath from the nozzle 50 is important to the result, and I therefore arrange for a delicate adjustment of this duration corresponding to the material under treatment, the rate of motion, and the respective temperatures.

The greater part of the oil or other agent constituting the hot bath is prevented from following the chain by suitable means at the desired distance from the orifice of the nozzle 50. In the instance shown a tank 60 is supported for longitudinal sliding adjustment within the tank 57 and the wall 61 of the tank 60 is provided with a relatively narrow aperture 62, through which the chain travels, the greater part of the stream of hot oil or other agent being stopped by the wall 61 from further travel with the blades. The reaction set up by the hot bath is definitely stopped by lowering the temperature of the blades to a sufficient extent, for instance below 100° F. Until the temperature is so lowered the temper of the hardened strip 14 is progressively lowered toward the teeth 16 and edge 15. I therefore provide at an adjustable distance from the nozzle 50 a cold bath 63. In the preferred form shown the bath 63 is a tank having perforations in line with the tense run of the saws, and supported, as on the edges of the side walls of the tank 60, for adjustment toward and from the front wall 61 of the tank 60. This support may be by lugs 64 and adjusting screws 65. The front wall of the tank 63 is provided with an overflow opening at 66, and the tank is kept full by an inlet pipe 67 of oil or other cooling medium at a temperature preferably less than 100° F. In operation the overflow through the gap 66 pours upon the blades immediately after their passage through the wall 61, and the place of this encounter with respect to the nozzle 50 measures the time during which the blades are subjected to the temper-drawing step in the hot bath. The overflow from tank 63 is drawn off through pipe 68 and cooler 69 by a circulating pump 70.

Preferably the excess of oil is returned to the tank 60 by an air jet 71, as shown.

A washer 72 adapted to wash the oil and scale from the blades by agitation against them in any desired manner by any desired washing medium is next encountered by the moving chain. It is recommended that the temperature of the washing solution be relatively low. The washer 72 may be of any desired form providing a free passage for the moving chain.

The washer is preferably followed by an air jet 75 adapted to dry or partially dry the washed blades.

The specific operation of the device has been mentioned above in connection with the subordinate agencies of which it is composed, and need not be repeated. It will be observed that the raw saws are continuously, successively and rapidly passed through the apparatus in which the general and local changes of temperature constituting the treatment take place, and that the saws delivered over the table 96 are relatively finished and, more importantly, at or about the temperature of the workroom. Saws subjected to treatment as above described when of homogeneous materials are uniform in quality and do not undergo change. I nevertheless recommend storing the finished product at the temperature of the workroom for several days before subjecting the blades to sharp changes of temperature.

What I claim is:—

1. Apparatus for treating a metal article comprising means to move such article in a certain direction, means in the path of said article for raising its temperature above the hardening reaction point, means in the path of said article for quenching it, and means in the path of said article for drawing the temper of the body region of said article and for gradually drawing the temper of an edge region thereof, whereby to spring-temper the body and graduate the temper of the edge region from a spring temper within to hardness at the edge.

2. Apparatus for treating metal articles comprising means to move a continuous succession of such articles in a certain direction, means in the path of said articles for raising their temperature above the hardening reaction point, means in the path of said articles for quenching them, and means in the path of said articles for drawing the temper of the body region of each article and for gradually drawing the temper of an edge region, whereby to spring-temper the body and graduate the temper of the edge region from a spring temper within to hardness at the edge.

3. Apparatus for treating metal articles comprising means to move a continuous succession of such articles at a predetermined rate in a certain direction, means in the path of said articles for raising their temperature above the hardening reaction point, means in the path of said articles for quenching them, and means in the path of said articles for drawing the temper of the body region of each article and for maintaining the temperature of the articles at a degree permitting gradually drawing the temper of an edge region during a predetermined extent of travel of each article.

4. Apparatus for heat treating metallic articles comprising means for moving the articles through the apparatus, means for hardening the articles in transit by first heating and then quenching them, and a heater for reheating different parts of the hardened articles in transit to different degrees to determine on subsequent cooling different degrees of hardness of the article, and means acting at a predetermined time after the emergence of an article from the heater for reducing the temperature of the article.

5. Apparatus for heat treating metallic articles comprising means for moving the articles at a predetermined rate through the apparatus, means for hardening the articles in transit by first heating and then quenching them, and a heater for reheating different parts of the hardened articles in transit to different degrees to determine on subsequent cooling different degrees of hardness of the article, and a bath entered at a predetermined distance from the heater for reducing the temperatures of the parts to a predetermined degree.

6. Apparatus for treating metallic articles comprising means for simultaneously heating different regions lying side by side in the direction of the length of the article to different degrees to determine different crystalline reactions upon subsequent cooling, and means for subjecting said articles thereafter to cooling to a predetermined degree.

7. Apparatus for treating metallic articles comprising means for first hardening the article uniformly, and means acting thereafter for simultaneously heating different regions lying side by side in the direction of the length of the article to different degrees to determine rehardening and a spring temper respectively upon subsequent cooling, and means for subjecting said articles thereafter to a bath acting to cool said regions to a predetermined degree effective to conserve the temper of the spring-tempered portion and quench the region to be re-hardened.

8. Apparatus for treating metallic articles comprising means for simultaneously heating different regions lying side by side in the direction of the length of the article to different degrees to determine different crystalline reactions upon subsequent cooling, and means for subjecting said articles thereafter for a predetermined time to a relatively hot bath.

9. Apparatus for treating metallic articles comprising means for simultaneously heating different regions lying side by side in the direction of the length of the article to different degrees to determine different crystalline reactions upon subsequent cooling, and means for subjecting said articles thereafter to the action of a bath of a hot agent acting to lower the temperature of said different regions at different rates.

10. Apparatus for treating metallic articles comprising means for simultaneously heating different regions lying side by side in the direction of the length of the article to different degrees to determine different crystalline reactions upon subsequent cooling, and means for subjecting said articles thereafter to cooling to a predetermined degree in a bath, in combination with means adjustable whereby to predetermine the duration of treatment in said bath.

11. In apparatus for heat treating blades, means for moving the blades endwise at a predetermined rate, means for simultaneously heating different longitudinal regions of each blade to different degrees, and means acting upon the blades after their passage of said heating means for first quenching to hardness the hotter parts of the blades and then gradually drawing from within the temper of these parts comprising devices for applying a relatively hot agent upon the blades, and means adjustable in the direction of travel of the blades for limiting the duration of application of such agent to the blades.

12. In apparatus for heat treating blades, means for moving the blades endwise at a predetermined rate, means for simultaneously heating different longitudinal regions of each blade to different degrees, and means acting upon the blades after their passage of said heating means for first quenching to hardness the hotter parts of the blades and then gradually drawing from within the temper of these parts comprising devices for applying a relatively hot agent upon the blades, and a reaction-checking bath adjustable in the direction of travel of the blades for limiting the effect of such agent upon the blades.

13. Apparatus of the class described having therein in combination means for moving an elongate article or series of articles at a predetermined rate through the apparatus, means for differently heating different regions of the article at a point in the progress of the article, means following in the direction of progress of the article for cooling it to a critical temperature below the temperature for the hardening reaction, and means operative during a predetermined extent of the distance between said heating and cooling means to expose the differently heated regions of the articles to the action of a tempering agent.

14. Apparatus for treating metallic articles having therein means for differently heating different portions of the article comprising a radiating mass near to and adapted to heat a portion of the article and protect said portion from exposure to other temperatures, means for causing relative movement between said mass and said article, and means for maintaining the exposed part of the article during passage of said mass at a different temperature from the protected portion, and for heating said mass.

15. Apparatus for treating metallic articles having therein means for differently heating different portions of the article comprising a radiating mass near to and adapted to heat a portion of the article and protect said portion from exposure to other temperatures, means for causing relative movement between said mass and said article, and heating means adapted simultaneously to heat said mass and the exposed portion of the article to different temperatures.

16. Apparatus for treating metallic blades having therein means for moving the blades at a predetermined rate through the apparatus, and a heater comprising a channeled block adapted to house in its channel and heat conformably to its temperature a portion only of the moving blade, and heating means acting on said block and the exposed portion of the blade, whereby to heat different portions of the article simultaneously to predetermined different degrees.

17. Apparatus for treating metallic blades having therein means for moving the blades at a predetermined rate through the apparatus, and a heater comprising a channeled block adapted to house in its channel and heat conformably to its temperature a portion only of the moving blade, heating means acting on said block and the exposed portion of the blade, whereby to heat different portions of the article simultaneously to predetermined different degrees, and means for quenching the hotter parts and gradually drawing the temper after quenching acting at and during a predetermined time after emergence from said block.

18. In apparatus for differently tempering different longitudinal regions of elongate metallic articles, means for differently heating the longitudinal regions of an article moving in the direction of its length, a quenching and tempering bath arranged to deliver a fluid agent on the heated article at a predetermined transverse line of the path taken by the article, and means for adjusting the inclination of said transverse line to the direction of travel.

19. In apparatus for differently tempering different longitudinal regions of elongate metallic articles, means for differently heating the longitudinal regions of an article moving in the direction of its length, a quenching and tempering bath comprising liquid supply means and a nozzle adapted to deliver a stream of liquid in the direction of travel of the article, and means for adjusting the direction of the nozzle angularly to the direction of travel of the article.

20. Apparatus for treating an elongate connected series of metallic articles having therein feeding means for moving the series of articles, treating means in desired succession arranged precedent to the feeding means along the path of travel of the series, and a tension device near the place of entrance of the articles to the apparatus comprising a fixed table over which the articles pass, a weight resting on the articles on said table, and means to prevent motion of the weight with the moving series of articles.

21. Apparatus for heat-treating saw blades comprising a feeding device for moving a connected succession of the saws to be treated at a predetermined rate through the apparatus, a furnace for heating the saws, a quenching tank for hardening the saws, a heater for heating the strip at the toothed edge to redness and the body of the saw to a lesser heat; means for delivering a stream of hot quenching and tempering fluid on the saws heated by said last mentioned heater, and means for limiting the action of the heated fluid comprising a reaction-checking bath at a predetermined distance from said stream-delivering means, the path of travel of said saws passing through each of said agencies upon actuation of the feeding device in the order named.

Signed by me at Boston, Massachusetts, this fourteenth day of December, 1918.

CHARLES NAPIER.